United States Patent
Schwaiger et al.

(10) Patent No.: US 10,488,670 B2
(45) Date of Patent: Nov. 26, 2019

(54) OPTICAL ELEMENT AND LIGHTING APPARATUS

(71) Applicant: OSRAM GmbH, Munich (DE)

(72) Inventors: Stephan Schwaiger, Ulm (DE); Juergen Hager, Herbrechtingen (DE)

(73) Assignee: OSRAM GmbH, Munich (DE)

( * ) Notice: Subject to any disclaimer, the term of this patent is extended or adjusted under 35 U.S.C. 154(b) by 19 days.

(21) Appl. No.: 15/654,760

(22) Filed: Jul. 20, 2017

(65) Prior Publication Data

US 2018/0024371 A1 Jan. 25, 2018

(30) Foreign Application Priority Data

Jul. 21, 2016 (DE) .................. 10 2016 213 380

(51) Int. Cl.
| | |
|---|---|
| G02B 27/09 | (2006.01) |
| H01S 3/00 | (2006.01) |
| F21S 41/143 | (2018.01) |
| F21S 41/24 | (2018.01) |
| F21S 41/255 | (2018.01) |
| F21S 41/265 | (2018.01) |
| F21S 41/32 | (2018.01) |
| F21S 41/663 | (2018.01) |
| F21S 41/153 | (2018.01) |
| G02B 27/00 | (2006.01) |
| G02B 27/30 | (2006.01) |

(52) U.S. Cl.
CPC ........ *G02B 27/0927* (2013.01); *F21S 41/143* (2018.01); *F21S 41/153* (2018.01); *F21S 41/24* (2018.01); *F21S 41/255* (2018.01); *F21S 41/265* (2018.01); *F21S 41/322* (2018.01); *F21S 41/663* (2018.01); *G02B 27/0955* (2013.01); *H01S 3/005* (2013.01); *G02B 27/0068* (2013.01); *G02B 27/30* (2013.01)

(58) Field of Classification Search
CPC ............ G02B 27/0927; G02B 27/0966; G02B 27/0955; G02B 19/0014; F21S 41/24; F21S 41/663; F21S 41/265; F21S 41/322; F21S 41/143; F21S 41/255; F21S 41/153; H01S 3/005
See application file for complete search history.

(56) References Cited

U.S. PATENT DOCUMENTS

| | | | | |
|---|---|---|---|---|
| 6,714,564 B1 * | 3/2004 | Meyers | ............. | F41G 1/35 359/727 |
| 2009/0109687 A1 * | 4/2009 | Householder | ........... | F21L 4/027 362/309 |

(Continued)

FOREIGN PATENT DOCUMENTS

| | | |
|---|---|---|
| DE | 102013108801 A1 | 2/2015 |
| DE | 102014104028 A1 | 9/2015 |
| DE | 102014207024 A1 | 10/2015 |

OTHER PUBLICATIONS

German Search Report based on application No. 102016213380.2 (9 pages) dated Apr. 7, 2017 (Reference Purpose Only).

*Primary Examiner* — Karabi Guharay
*Assistant Examiner* — Nathaniel J Lee

(57) ABSTRACT

In various embodiments, an optical element is provided. The optical element includes an imaging region with a lens arrangement which is aligned along an optical axis, and a collimation region which surrounds the imaging region to the side of the optical axis.

20 Claims, 1 Drawing Sheet

(56) References Cited

U.S. PATENT DOCUMENTS

| | | | |
|---|---|---|---|
| 2010/0097809 A1* | 4/2010 | Munro | F21V 5/04 |
| | | | 362/308 |
| 2011/0096553 A1 | 4/2011 | Shimokawa | |
| 2015/0049240 A1 | 2/2015 | Schneider et al. | |
| 2015/0268481 A1 | 9/2015 | Strohmeier et al. | |
| 2016/0347236 A1* | 12/2016 | Yatsuda | B60Q 1/085 |
| 2017/0122516 A1 | 5/2017 | Hager et al. | |

* cited by examiner

OPTICAL ELEMENT AND LIGHTING APPARATUS

CROSS-REFERENCE TO RELATED APPLICATION

This application claims priority to German Patent Application Serial No. 10 2016 213 380.2, which was filed Jul. 21, 2016, and is incorporated herein by reference in its entirety.

TECHNICAL FIELD

Various embodiments relate generally to an optical element, having an imaging region with a lens arrangement, which lens arrangement is aligned along an optical axis. Various embodiments also relate to a lighting apparatus having such an optical element. Various embodiments are applicable, for example, to projectors, e.g. for vehicles, stage and effect lighting, external lighting, etc.

BACKGROUND

Automobile technology has disclosed headlamp systems in which the light distribution or the light-emission pattern is produced by a plurality of light sources (e.g. by a plurality of LEDs arranged in a row and/or as a two-dimensional matrix).

Conventional headlamp systems, use is made of a plurality of individually switchable light sources (usually LEDs) in order to design the resultant light-emission pattern to be variable. Here, the variation of the light-emission pattern is usually restricted to brightness variations of the corresponding regions in the light distribution, which are actuated by the respective light sources.

What is common to all headlamp systems for automobile technology is that a so-called basic light distribution (e.g. dimmed headlamps, near field lighting) is required for safety in traffic, said basic light distribution typically not being changeable or only changeable to a small extent. If the intention is to design the light distribution to be variable (e.g. to highlight objects or adapt the light distribution or the light-emission pattern to a particular speed), a "constant" portion and a "variable" portion of the light-emission pattern are required. These two portions are provided by different optical systems, meaning a great outlay in terms of costs and components. Moreover, such different optical systems typically require a lot of installation space and are susceptible to external influences such as tremors, etc.

SUMMARY

In various embodiments, an optical element is provided. The optical element includes an imaging region with a lens arrangement which is aligned along an optical axis, and a collimation region which surrounds the imaging region to the side of the optical axis.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
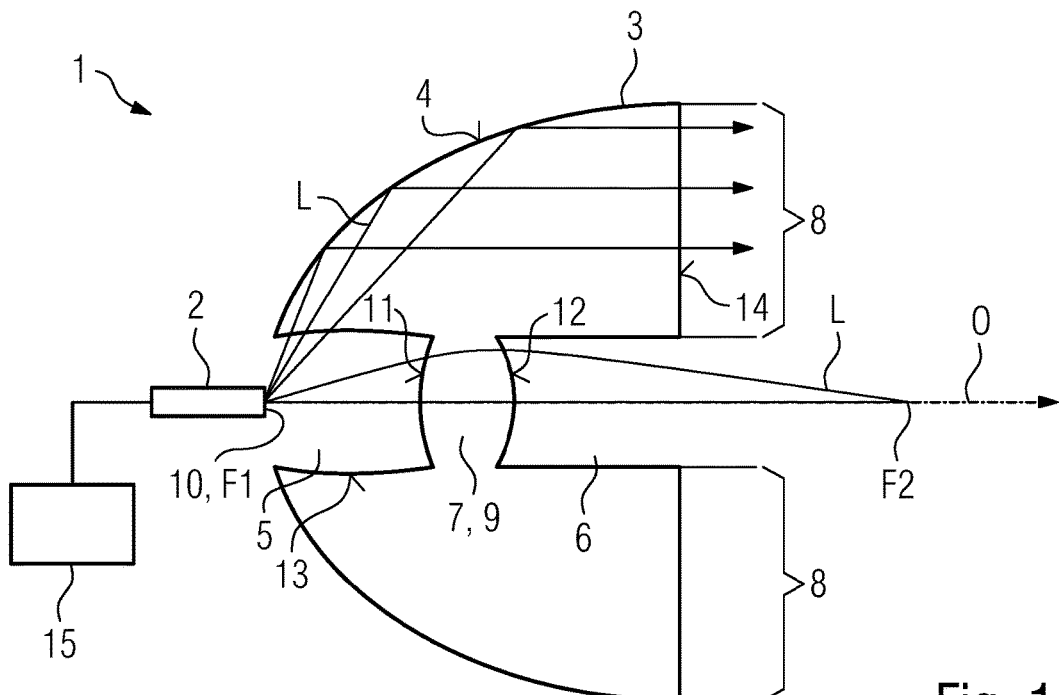
FIG. 1 shows, as a sectional illustration, a lighting apparatus in accordance with a first embodiment in a side view.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments may at least partly overcome the disadvantages of the conventional apparatuses and, for example, provide an improved option for providing a light-emission pattern of a lighting apparatus with a time-varying portion and a portion which is at least predominantly constant in time, to be precise by means of a particularly compact, robust and/or economical design.

Various embodiments provide an optical element, including a first region (referred to as "imaging region" below without loss of generality) with a lens arrangement which is aligned along an optical axis and a second, collimating region (referred to as "collimation region" below without loss of generality) which surrounds the imaging region to the side of the optical axis.

There is beam shaping, e.g. imaging beam shaping, of the light incident on an article plane (focal plane) in relation to the lens arrangement or of light emitted by a light source situated in the article plane, said beam shaping being carried out by the lens or the lens arrangement of the imaging region. Light incident on the collimation region is collimated or set parallel and homogenized or made more uniform in the process. Thus, the light incident in the collimation region is not focused, or not focused sharply, by the collimation region.

Below, the pattern of the light incident on the optical element is referred to as "light-incidence pattern". In various embodiments, the light-incidence pattern may include a local brightness distribution, a local color distribution, a local beam direction, etc.

Consequently, a first light-emission pattern is producible in an image plane or in the far field by means of the imaging region, said light-emission pattern imaging a pattern (in particular a local brightness distribution) of the light incident on the article plane of the imaging region in a precise manner and with high resolution. The precise and highly resolving imaging applies, by way of example, for the case where a light-emission face of a light-producing device, which produces the light, is situated in a focal plane of the imaging region and consequently also lies in the article plane. If the portion of the light-incidence pattern incident on the article plane of the imaging region is varied—e.g. by varying a brightness distribution of the light-emission face—there is an according change in the first light-emission pattern.

A second light-emission pattern is produced by means of the collimation region, the brightness distribution of said light-emission pattern being very uniform (it may also be referred to as "basic light distribution"). A local brightness variation of the portion of the light-incidence pattern incident on the article plane of the collimation region hardly changes a uniform property of the second light-emission pattern. It may be probided that the article plane of the imaging region and the article plane of the collimation region coincide. As a consequence, an overall light-emission pattern of the optical element produced by the superposition of the first light-emission pattern and the second light-emission pattern may facilitate a production of a large-area uniform portion and a variable portion which images with a high resolution. Moreover, the optical element can be robust and compact and, furthermore, make do with few components or optical parts.

Thus, a light-producing device, by means of which the optical element may be irradiated, is able to simultaneously irradiate the imaging region and the collimation region. A common light-entrance face (object face) of the optical element thus includes light-entrance portions (object portions) of the imaging region and of the collimation region. The light-incidence pattern thus extends over the imaging region and over the collimation region.

The first light-emission pattern may be surrounded by the second light-emission pattern and thus form a "core" of the overall light-emission pattern.

In one configuration, the optical element is manageable as a single element, to be precise even if it is composed of a plurality of components. This may facilitate particularly simple handling and precise positioning. This configuration may also be referred to as (virtually) integral manageability.

The collimation region may surround the imaging region in a completely circumferential manner or else sector-by-sector in relation to the optical axis.

A material of the imaging region and/or of the collimation region is at least partly light transmissive, e.g. at least partly transparent to at least a small portion of electromagnetic radiation from the region of the visible, infrared or ultraviolet range. The material of the imaging region and/or of the collimation region may be a plastic or a glass. The material of the imaging region and the material of the collimation region may be the same or different.

The lens arrangement being aligned along an optical axis is always satisfied in the case where the lens arrangement has only one lens or one lens region. This feature may then also be omitted. If the lens arrangement has a plurality of lenses or lens regions, this feature may include, by way of example, that a plurality of lenses or lens regions are arranged in succession in the direction of, or along, an optical axis. Here, the optical axes of the plurality of lenses or lens regions may coincide. However, the plurality of lenses or lens regions may also have parallel but laterally offset optical axes, for example by virtue of being arranged with lateral offset. Moreover, the plurality of lenses or lens regions may have optical axes which are oblique or non-parallel to one another. The plurality of lenses or lens regions may then be arranged in succession along a common axis, e.g. along one of the optical axes. This case may be present, for example, if lenses or lens regions are arranged in a row but are oblique in relation to this axis.

The optical axes of the collimation region and of the imaging region may coincide, extend parallel to one another or be oblique in relation to one another.

The provision of a time-varying portion relates, by way of example, to the temporal resolution of the human eye or its persistence of vision. Within this meaning, the light emitted by the light source is considered to be variable if it is varied at a speed that is perceived by the human eye. Accordingly, the light emitted by the light source may be considered to be constant if it is varied at a frequency that is not perceived by the human eye (e.g. in the case of a PWM actuation).

In one development, the optical element is an integrally produced body. Thus, it is not produced from a plurality of separately produced and then married or combined optical components. This configuration may provide that the production thereof is particularly simple and economical. Also, such an optical element is particularly robust and need not be adjusted as such.

In one development, the optical element is an injection molded part made of plastic (PMMA, PC, silicone, etc.) such that it is producible in a particularly economical manner. The optical element may have been produced by means of a single component injection molding, multiple component injection molding, etc.

In a further development, the optical element is a glass part and, for example, produced by glass pressing. This may facilitate particularly high refractive values of the lens arrangement and, optionally, of the collimation region and a particularly high durability in relation to high radiation densities.

In one development, the optical element has a plurality of separately produced optical components which are unified or married in the optical element. As a result, it is possible to provide an optical element with a particularly complex design. In one development, the collimation region and the imaging region are produced separately from one another and the imaging region is inserted into the collimation region. The imaging region may, in turn, have a plurality of separately produced lenses. Furthermore, the lenses of the imaging region may be held in a common frame and be connected to the collimation region. This results in accurate positionability and manageability as a single element.

In a further configuration, the lens arrangement is mechanically and/or electromechanically and/or electromagnetically, etc., adjustable for the purposes of varying the optical properties thereof. This yields the advantage that the beam shaping that is producible by means of the lens arrangement can be varied, for example a position of a focus. In one development, at least one lens of the lens arrangement is mechanically adjustable to this end. This lens may have been produced separately.

In one development, an actuator, e.g. an electric motor, a piezo-actuator, etc., is present for adjusting the lens arrangement.

In one development, at least one lens or lens region of the lens arrangement is deformable for varying the optical property thereof, for example by way of pressing that is directed radially inward in the direction of the optical axis. As a result of this, the lens or lens region bulges more which, for example, may modify a focus.

In a further configuration, the lens arrangement includes a plurality of lenses which are positionable in variable fashion relative to one another. This allows the beam shaping to be varied particularly strongly by way of the lens arrangement. To this end, the lens arrangement has at least one lens that was produced separately, said lens being selectively positionable closer to, or further away from, another lens along the optical axis.

In one development thereof, at least one lens is displaceable. To this end, it may be held on a movable carrier.

In another development, the lenses are arranged in succession in a straight line along the optical axis. A displaceable lens may be displaceable, in particular, along the optical axis.

In a further configuration, the collimation region is embodied as a reflector. This facilitates particularly strong light deflection for collimation in a small space.

In an even further configuration, the collimation region is embodied as a TIR region. Thus, light coupled into the collimation region may be reflected at a surface in the TIR region by total-internal reflection. This configuration facilitates the provision of an optical element that is producible in a particularly simple and economical manner.

In an alternative or additional configuration, the collimation region has a diffusely or specularly reflecting layer as reflection face. This may facilitate a particularly light optical element and particularly precise setting of a width of an outer edge of the light-emission pattern that is produced by the collimation region. By way of example, the layer may be applied to a surface of a light-transmissive main body of the collimation region (e.g. a mirroring aluminum or silver layer, a dichroic layer or a diffusely reflecting layer with white pigments, e.g. including titanium oxide, etc.). Alternatively, the reflector may be a self-supporting reflector, for example a sheet part or a reflecting layer that is applied to a carrier—which does not act as a collimation region. By way of example, the carrier may be a sheet part, a glass part or a plastic part. By way of example, the sheet part may be an aluminum sheet part.

In another configuration, the collimation region has a reflecting surface that widens in a bowl-like manner in the direction of the optical axis. This may facilitate a particularly pronounced collimation in the direction of the optical axis. In one development, the reflecting surface is a surface that, at least in sections, has a parabolic form, a spherical form, an aspherical form or a free form. The optical face of the collimation region need not be rotationally symmetric.

Moreover, in one configuration, a light-entrance face of the collimation region has a beam-forming face. As a result, the light that is incident on the light-entrance face can be distributed in a particularly uniform manner. This may apply, for example, to the case where the collimation region is embodied as a reflector, wherein the beam-forming light-entrance face may then be embodied, for example, to distribute the incident light onto the reflecting surface in a particularly uniform manner. This may yield the effect that the brightness distribution of the light that is emitted by the collimation region can be made particularly uniform. This may apply, very particularly, for the case where the collimation region is a TIR region. The beam-forming light-entrance face may then, for example, be embodied to distribute the incident light onto the reflecting surface in such a way that the condition for a TIR reflection is reliably observed.

In another development, as well, a light-exit face of the collimation region is embodied in a beam-forming or beam-homogenizing manner, for example in a non-planar fashion and/or in the form of facets. An effect emerging from this development may be that the sensitivity of the light emitted by the collimation region or light-emission pattern on a local brightness variation of the light that is incident in the collimation region can be reduced even more. Facets and the form (e.g. free-form) of the light-exit face additionally provide more freedom in the design of the light distribution. To this end, the light-exit face may be embodied as e.g. a multi-faceted free-form face which permits further deflection of the light passing therethrough by means of light refraction. By way of example, the multi-faceted free-form face may include a plurality of micro-lenses or micro-pads. The multi-faceted free-form face may also include a Fresnel structure such as Fresnel rings or the like.

Moreover, in one configuration, the imaging region and/or the collimation region are embodied with rotational symmetry about the optical axis. As a result, it is possible to produce a light-emission pattern with a particularly uniform basic form. A rotationally-symmetric embodiment may be understood to mean, for example, an n-fold rotational symmetry, i.e. a rotational symmetry which forms in the case of a rotation through $360°/n$, with $n=2, 3, \ldots$. The imaging region and/or the collimation region may also be embodied completely rotationally symmetric ("circularly symmetric"), i.e. have rotational symmetry under any angle of rotation, in relation to the optical axis. In a development of this, an external contour of the imaging region and/or of the collimation region has a circular, elliptical or oval form when viewed against the optical axis. Depending on application and manifestation of the reflecting faces (e.g. of TIR faces, diffusely reflecting faces or mirroring faces) for the collimation, it is also possible to break any type of symmetry.

Various embodiments provide a lighting apparatus, including an optical element as described above and a light-producing device for simultaneously illuminating the collimation region and the imaging region of the optical element, wherein the lens arrangement is adjustable by mechanical means for the purposes of varying the optical property thereof and/or the light-producing device is configured to locally vary an emission characteristic of the light emitted thereby (e.g. a light distribution) or image a light-incidence pattern incident on the article plane(s) in a variable manner.

This lighting apparatus may facilitate the production of the second light-emission pattern for the homogeneous illumination and the first light-emission pattern for the simultaneous time-varying or dynamic illumination in a simple and economically implementable manner.

The local variation of the emission characteristic or of the light distribution in the article plane or in the article planes may, for example, be a local variation of the brightness or brightness distribution. The second light-emission pattern that is produced by the collimation region however only reacts slightly to the precise location of the light that comes into the collimation region.

However, in principle it is also possible for the light that is incident on an article plane to have a local color variation. The collimation region effects the collimation also in respect of the color variation and therefore, as a rule, also effects a unifying or homogenizing property, while the imaging region maintains a color separation.

In particular, the light-producing device may emit white light.

In one configuration, the light-producing device includes a plurality of light sources—e.g. arranged next to one another—which are individually actuatable, e.g. for the purposes of setting the brightness thereof. As a result, the light beam produced by the light sources and, consequently, the light-incidence pattern as well may be locally varied in the cross section at or in the object face of the optical element.

In one development, the plurality of light sources are each configured (e.g. arranged) for simultaneously illuminating the collimation region and the imaging region. Expressed differently, a plurality of light sources are present, which individually illuminate both the collimation region and the imaging region. In another development, this applies to all light sources. The effect obtained thereby may be that the collimation region may be illuminated in a particularly uniform manner.

In another development, at least one of the light sources is configured to illuminate only the collimation region or only the imaging region. As a result of this, it is possible to change the brightness of the first light-emission pattern and/or of the second light-emission pattern, without this having an influence on the respective other light-emission pattern.

In one development, the light-producing device includes at least one light emitting diode (LED). LEDs have a particularly high luminosity and are particularly compact and long living. Moreover, LEDs have the advantage that, as a matter of principle, they have a Lambert-type emission characteristic. This emission characteristic facilitates a particularly large-area irradiation, which has little local variation, of the collimation region and a stronger and locally more concentrated irradiation of the imaging region. This assists the formation of a uniform second emission pattern and a clearly perceivable variation in the first emission pattern. In various embodiments, the LEDs may be present as LED chips, e.g. as surface-emitting LED chips, e.g. so-called TOP LEDs. The plurality of LEDs may be inorganic LEDs or OLEDs.

A development that is advantageous for easily producing and varying the light-emission pattern provides for a plurality of LEDs to be arranged in a uniform pattern, e.g. in a matrix-like pattern.

However, as a matter of principle, the type of the employed light source(s) is not restricted.

Thus, in a further development, the light-producing device includes a phosphor body (also referred to as a conversion body) that may be irradiated by laser light and completely or partly wavelength-converts said laser light. By way of example, the phosphor body may partly convert blue laser light into yellow conversion light or secondary light in order, overall, to produce a blue-yellow or white mixed light as used light. If the laser and phosphor body are spatially separated from one another, this is also referred to as a LARP ("laser-activated remote phosphor") arrangement. Such a LARP arrangement also assists the formation of a uniform second emission pattern and a clearly perceivable variation in the first emission pattern. A light-emission face of a LARP light-producing device may correspond to a used-light-emitting surface of the phosphor body.

In another configuration, the light-producing device includes a light modulator which is configured to locally vary the light emitted by at least one light source. This may achieve the effect that the at least one light source is operable at a constant brightness, which simplifies an actuation of the at least one light source and/or which may increase a resolution of the local variation. In one development, the light modulator is configured to locally vary, in the cross section, a brightness of a light ray or light beam emitted by at least one light source.

However, in principle, it is also possible for the light-producing device to be configured to actuate a plurality of light sources individually and additionally dispose a light modulator optically downstream of the light sources. This may allow a particularly high local resolution of the light-emission pattern to be achieved.

In one development, the light modulator is a light-transmissive screen, e.g. a liquid-crystal display (LCD) screen.

In a further development, the light modulator has a micromirror array (which may also be referred to as DMD) for deflecting light from the at least one light source onto the optical element. This light may be varied locally by the micromirror array, for example switched on and off on a pixel-by-pixel basis. For a particularly high spatially resolved variation of the light beam incident on the optical element, the light-producing device may include a plurality of micromirror arrays that are e.g. optically connected in series and/or in parallel.

Moreover, in one development, the light modulator has an MEMS mirror (e.g. operated resonantly or else non-resonantly) which drives the light beam reflected thereby in a trajectory-like or scanning manner over a material, optically transparent article plane of the optical element. Here, a light spot is produced at an instant on the article plane of the optical element. When integrated over a plurality of instants, a light-incidence pattern is produced on the object face in this manner, e.g. for the human eye. In a further exemplary embodiment, a wavelength conversion element is situated in the article plane, said wavelength conversion element at least partly converting an incident excitation light into conversion light.

A local variation, in particular a brightness variation, of this light-incidence pattern can be configured by a temporal variation of an angular speed or resonant frequency of the MEMS mirror. This corresponds to a time variation of a sweep speed of the light beam or the luminous spot on the optical element.

In the case where the light-producing device is configured to individually actuate at least one light source illuminating the MEMS mirror, the local variation of the light-incidence pattern may additionally or alternatively be obtained by a temporal brightness variation of this light source, e.g. in the style of a so-called flying-spot method. Here, the light source may be switched on and off or dimmed in portions when passing over the trajectory on the optical element, e.g. by a PWM modulation of the light source.

A configuration for the case where the light-producing device is configured to locally vary a light distribution of the light-emission face in an article plane or the light-incidence pattern produced therein is that a luminous flux emitted by the light-producing device remains constant. Thus, the relative brightness values of individual light sources may be varied, only if the overall luminous flux produced thereby remains constant. What this achieves is that the brightness and/or the light distribution of the second light-emission pattern remains at least approximately constant, even if the local light distribution of the first light-emission pattern is varied. This may apply, in particular, if the considered light sources each illuminate both the imaging region and the collimation region at the same time.

In one development, the light-producing device is arranged in such a way that the light-emission face thereof is situated in a region of a focal plane of the lens arrangement. This facilitates imaging of the produced light pattern that is e.g. in focus by way of the imaging region. The light-emission face may be integral or multi-part. By way of example, the light-emission face of a light-producing device including a plurality of LEDs may be composed of the emission faces of the individual LEDs.

In one configuration, the light-emission face of the light source is variable, e.g. in relation to its form and/or position and/or arrangement, for example by displacing, rotating, inclining, changing the luminance distribution (e.g. in the case of LARP), switching off possible picture elements (if it is composed of a plurality of picture elements), etc. In this manner, use may be made in a manner of light from the collimation region being emitted in a practically unchanged manner, while light of the imaging portion may be imaged directly, i.e. modified.

The lighting apparatus may be a module. The lighting apparatus may include at least one optical unit disposed downstream of the optical element, or else it may dispense therewith.

In one configuration, the lighting apparatus is a projector or part of a projector, e.g. a vehicle headlamp.

In general, the lighting apparatus may be a vehicle lighting apparatus or part of a vehicle lighting apparatus. Alternatively, the lighting apparatus may be provided and/or configured for stage and/or effect illumination, external illumination, etc.

Various embodiments provide a vehicle including at least one such lighting apparatus. The vehicle may be a motor vehicle (e.g. a motorized vehicle such as an automobile, truck, bus, etc. or a motorbike), a train, a watercraft (e.g. a boat or ship) or an aircraft (e.g. an airplane or a helicopter).

FIG. 1 shows a lighting apparatus 1 including a light-producing device 2 and an optical element 3.

By way of example, the optical element 3 is an integrally produced, transparent body made out of a plastic or glass. It has an e.g. paraboloid outer lateral face 4, or an outer lateral face formed by a free-form calculation, which in this case widens toward the front in the direction of an axis O.

The optical element 3 includes a rearward depression 5, introduced centrally in relation to the axis O, and a front-side depression 6, introduced centrally in relation to the axis O. The two depressions 5 and 6 are separated from one another by way of a separating wall 7 that is formed in a lens-type manner. The lens-type separating wall 7 forms a lens arrangement of an imaging region 9 of the optical element 3, while the surrounding region of the optical element 3 that laterally encircles the lens-type separating wall 7 forms a collimation region 8. Since the lens-type separating wall 7 constitutes the only lens of the lens arrangement in this case, the lens-type separating wall 7 corresponds to the imaging region 9. The axis O corresponds to the optical axis of the lens-type separating wall 7. The collimation region 8 and the imaging region 9 may be embodied in a rotationally symmetric manner, e.g. a circularly symmetric manner, in relation to the optical axis O.

With the light-emission face 10 thereof, the light-producing device 2 is situated at or in the region of a focal plane F1 of the lens—type separating wall 7. The light L emitted by the light-emission face 10 partly impinges on the lens-type separating wall 7, the rear surface 11 of which corresponds to a light-entrance face and the front-side surface 12 of which corresponds to a light-exit face. A light distribution or brightness distribution of the light-emission face 10, which may form the article plane of the imaging region, is imaged at a certain distance ("far field") in front of the optical element 3, or produces a first light-emission pattern there, by way of the optically active faces 11, 12 of the lens-type separating wall 7.

Another part of the light L emitted by the light-emission face 10 impinges on an inner wall 13 of the rearward depression 5 that adjoins the lens-type separating wall 7. This inner wall 13 corresponds to a light-entrance face of the collimation region 8. The light L that is coupled in there passes through the collimation region 8 and is decoupled again at a ring-shaped front face 14 of the collimation region 8. Hence, the front face 14 corresponds to a light-exit face of the collimation region 8. Here, the light L coupled into the collimation region 8 may be reflected, at least in part—e.g. completely—at the lateral face 4 embodied as a reflector, before said light is decoupled again. Thus, the collimation region 8 is embodied as a reflector with a reflecting surface that widens in a bowl-shaped manner in the direction of the optical axis O, namely the lateral face 4. So that light losses are kept particularly low, the light-emission face 10 is situated at an opening of the rearward depression 5 or in the rearward depression 5. This avoids the light being radiated past the optical element 3. For the purposes of particularly uniform incoming light radiation, the light-emission face 10 is situated on the axis O, e.g. centered thereon. In various embodiments, the light-emission face 10 also forms the article plane of the collimation region 8.

In one development, the lateral face 4 may be embodied as a TIR reflector, so that, after passing through the inner wall 13, light L that is emitted by the light-emission face 10 is incident on the lateral face 4 at such an angle that it is reflected in the direction of the front face 14 on account of total internal reflection. Thus, the collimation region 8 is embodied as a TIR region. In order to assist the light L being incident uniformly, and at an angle that is suitable for TIR reflection, on the lateral face 4 and/or being coupled into the optical unit 3, 8 to a large extent where possible, the inner wall 13 has a beam-forming form, e.g. a concave form in this case.

In another development, the collimation region is no TIR body but has a diffusely or specularly reflecting reflector (not imaged here), which may be formed analogously to the lateral face 4. In this development, light L emitted by the light-emission face 10 onto the collimation region is incident directly on the reflector after passing through air and reflected forward by said reflector in order to produce a second light-emission pattern. That is to say, this light does not pass through a light-transparent solid-body region of the optical element.

Light L emerging from the front face 14 and forming a second light-emission pattern is not imaging, but collimated and moreover locally homogenized. As a result, the second light-emission pattern facilitates a uniform illumination. The second light-emission pattern may have a residual divergence. The second light-emission pattern may be formed in a targeted manner (e.g. not perfectly collimated but equipped with an angle-dependent variation).

In order to vary the first light-emission pattern, the light-emission face 10, which may form the article plane, is operable in a locally variable manner. To this end, the light-emission face 10 is able to locally vary its brightness, e.g. in accordance with a change in the emission characteristic of the light source(s). Then, the light-producing device 2 may, to this end, include a plurality of—e.g. matrix-shaped—LED chips arranged next to one another (not depicted here), the individual emission faces of which constitute portions of the (overall) light-emission face 10. The LED chips are individually actuatable by means of a control unit 15 and respectively illuminate both the collimation region 8 and the imaging region 9 on account of their Lambert-type emission characteristic. If some or all of the LED chips are actuated differently (e.g. switched on, switched off, dimmed, etc.) than previously, the modified emission characteristic of the light source(s) is converted into the light-emission pattern (in the far field) by the imaging region 9 in accordance with the imaging properties of the imaging region 9. Since the collimation region 8 is a rectifying, non-imaging optical unit, an influence on the second light-emission pattern is small.

In various embodiments, there may be a brightness variation of the second light-emission pattern if there is a change in the (overall) luminous flux of the light-emission face 10. By way of example, this may be the case if previously switched-off LED chips are switched on and the remaining LED chips are operated without change. The increase in the brightness of the second light-emission pattern emerging thus may be a wanted or an unwanted effect. If this is an unwanted effect, the control unit 15 may be configured to keep the overall luminous flux of the light-producing device 2 constant. By way of example, if LED chips are connected, this may be achieved by virtue of the brightness level of all switched-on LED chips being lowered.

The front face 14 is plotted as smooth here, but it may optionally have a beam-forming structure, e.g. by being formed (concave, convex, free-form), and/or by the presence of facets, micro-lenses, micro-pads, Fresnel rings, roughness, etc.

The lighting apparatus 1 may be a projector or part of a projector, e.g. for vehicles, for stage illumination, for effect illumination or for external illumination.

Figure 2:
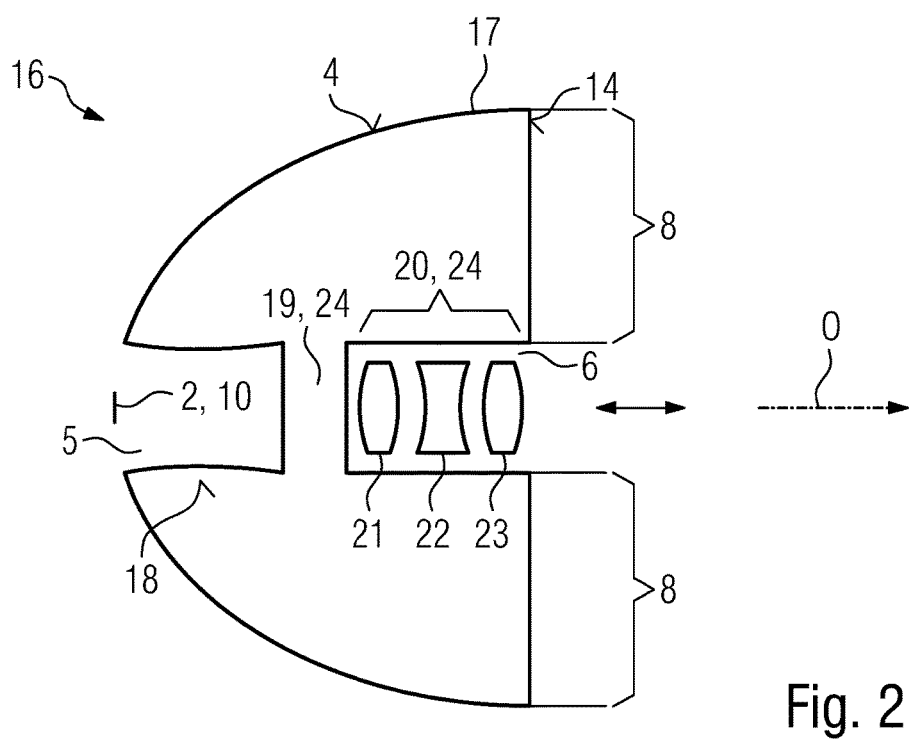
FIG. 2 shows, as a sectional illustration, a lighting apparatus in accordance with a second embodiment in a side view.

As a sectional illustration, FIG. 2 shows a lighting apparatus 16 in a side view. The lighting apparatus 16 likewise includes a light-producing device 2, with, however, only the light-emission face 10 thereof being shown here, which also may form the article plane of the lens arrangement 20 in this case.

An optical element 17 has a similar design to that of the optical element 3, but it now has an inner wall 18 of the rearward depression 18, which has an exemplary convex form.

Moreover, a separating wall 19 now has plane light-entrance and light-exit faces, which do not have, or do not have a substantial, beam-forming effect. A lens arrangement 20 is housed in the front-side depression 6 and includes three lenses 21, 22 and 23 arranged in succession along the axis O. The lenses 21 to 23 have been produced separately and inserted into the front-side depression 6, for example by means of a holder (not depicted here). An imaging region 24 may include the separating wall 19 and the lenses 21 to 23. Some of the light emitted by the light-emission face 10 consequently passes through the separating wall 19 and then through the lenses 21 to 23 of the imaging region 24. The lenses 21 to 23 focus the light and produce a first light-emission pattern.

At least one of the lenses 21 to 23 is displaceably held along the axis O, as indicated by the double-headed arrow, such that the lenses 21 to 23 are variably positionable in relation to one another by virtue of their distances from one another being adjustable. As a result, a focus or focal plane of the lens arrangement 20 may be displaced along the axis O, which also corresponds to an optical axis of the lens arrangement 20. For the purposes of mechanically displacing the lenses 21 to 23, these may be guided in longitudinally displaceable manner, e.g. by means of the holder, and be connected to a drive (e.g. a piezo-actuator). By way of example, the drive may be controlled by means of the control unit 15.

A variation of the first light-emission pattern can be achieved purely by displacing the lenses 21 to 23. The light emitted by the light-emission face 10 can then be kept constant over time. This may facilitate the use of a single light source. Alternatively, the light-emission face 10 may locally vary the light emitted thereby, in a manner analogous to the lighting apparatus 16, and so a multifaceted variation is facilitated.

Although the invention was illustrated more closely and described in detail by way of the exemplary embodiments, the invention is not restricted thereto and other variations may be derived herefrom by a person skilled in the art, without departing from the scope of protection of the invention.

Thus, the optical element may also have a plurality of lens regions that are securely connected to the collimation region 8, said lens regions being arranged in succession along the axis O.

Also, the light-entrance face of the collimation region may be embodied in a non-beam-forming manner.

Moreover, the separating wall 19 may be dispensed with. The optical element may then have a passage that is present along the axis O.

Generally, "a(n)", "one", etc. can be understood to mean a singular or a plural, e.g. in the sense of "at least one" or "one or more", etc., as long as this is not explicitly excluded, e.g. by the expression "exactly one", etc.

Moreover, a numerical indication can encompass exactly the indicated number and also a customary tolerance range, as long as this is not explicitly excluded.

LIST OF REFERENCE SIGNS

Lighting apparatus 1
Light-producing device 2
Optical element 3
Lateral face 4
Rearward depression 5
Front-side depression 6
Separating wall 7
Collimation region 8
Imaging region 9
Light-emission face 10
Rearward surface 11
Front-side surface 12
Inner wall 13
Front face 14
Control unit 15
Lighting apparatus 16
Optical element 17
Rearward depression 18
Separating wall 19
Lens arrangement 20
Lens 21
Lens 22
Lens 23
Imaging region 24
First focus F1
Light L
Axis O While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. An optical element, comprising:
an imaging region with a lens arrangement which is aligned along an optical axis; wherein the lens arrangement comprises a plurality of lenses;
a collimation region which surrounds the imaging region to a side of the optical axis; and
wherein the optical element comprises a first side and a second side opposite to the first side, wherein the first side is configured to face a light source, and wherein the second side comprises a depression, and wherein the lens arrangement is arranged in the depression of the second side.

2. The optical element of claim 1, wherein the optical element is manageable in integral fashion.

3. The optical element of claim 1, wherein the lens arrangement is at least one of deformable or adjustable for varying an optical property thereof.

4. The optical element of claim 3, wherein the plurality of lenses is positionable in variable fashion relative to one another.

5. The optical element of claim 1, wherein the collimation region is embodied as a reflector.

6. The optical element of claim 5, wherein at least one of the collimation region is embodied as a total internal reflection region or the collimation region has a diffusely or specularly reflecting layer.

7. The optical element of claim 1, wherein the collimation region has a reflecting surface that widens in a bowl-like manner in a direction of the optical axis.

8. The optical element of claim 1, wherein a light-entrance face of the collimation region has, or is, a beam-forming face.

9. The optical element of claim 1, wherein at least one of the imaging region or the collimation region are embodied with rotational symmetry about the optical axis.

10. The optical element of claim 1, wherein the first side of the optical element comprises a depression; and wherein a separating wall is arranged between the depression of the first side of the optical element and the depression of the second side of the optical element.

11. A lighting apparatus, comprising
an optical element, comprising:
   an imaging region with a lens arrangement which is aligned along an optical axis; wherein the lens arrangement comprises a plurality of lenses;
a collimation region which surrounds the imaging region to a side of the optical axis; and
   wherein the optical element comprises a first side and a second side opposite to the first side, wherein the first side is configured to face a light source, and wherein the second side comprises a depression, and wherein the lens arrangement is arranged in the depression of the second side; and
a light-producing device configured to simultaneously illuminate the collimation region and the imaging region of the optical element;
wherein the lens arrangement is at least partly at least one of deformable or adjustable by mechanical means for varying an optical property thereof.

12. The lighting apparatus of claim 11, wherein the light-producing device has a plurality of individually actuatable light sources for a local variation of an emission characteristic.

13. The lighting apparatus of claim 11, wherein the light-producing device comprises a light modulator which is configured to locally vary a brightness of the light emitted by at least one light source in an article plane or focal plane.

14. The lighting apparatus of claim 11, wherein the light-producing device is a laser-activated remote phosphor light-producing device.

15. The lighting apparatus of claim 11, wherein a luminous flux emitted by the light-producing device is able to be kept constant.

16. The lighting apparatus of claim 11, wherein the lighting apparatus is a projector or part of a projector.

17. The lighting apparatus of claim 16, wherein the lighting apparatus is a projector or part of a projector of a headlamp.

18. A lighting apparatus, comprising
an optical element, comprising:
   an imaging region with a lens arrangement which is aligned along an optical axis; wherein the lens arrangement comprises a plurality of lenses;
a collimation region which surrounds the imaging region to a side of the optical axis; and
   wherein the optical element comprises a first side and a second side opposite to the first side, wherein the first side is configured to face a light source, and wherein the second side comprises a depression, and wherein the lens arrangement is arranged in the depression of the second side
a light-producing device configured to simultaneously illuminate the collimation region and the imaging region of the optical element;
wherein the light-producing device is configured to locally vary an emission characteristic of the light emitted thereby.

19. The lighting apparatus of claim 18, wherein the light-producing device has a plurality of individually actuatable light sources for a local variation of the emission characteristic.

20. The lighting apparatus of claim 18, wherein the light-producing device comprises a light modulator which is configured to locally vary a brightness of the light emitted by at least one light source in an article plane or focal plane.

* * * * *